US006400532B1

(12) United States Patent
Mei

(10) Patent No.: US 6,400,532 B1
(45) Date of Patent: Jun. 4, 2002

(54) RECORDING HEAD SUSPENSION WITH COUPLED DIMPLE AND CHANNEL

(75) Inventor: Shijin Mei, Temecula, CA (US)

(73) Assignee: Magnecomp Corp., Temecula, CA (US)

( * ) Notice: Subject to any disclaimer, the term of this patent is extended or adjusted under 35 U.S.C. 154(b) by 0 days.

(21) Appl. No.: 09/730,012

(22) Filed: Dec. 4, 2000

Related U.S. Application Data

(63) Continuation-in-part of application No. 09/215,405, filed on Dec. 18, 1998, now abandoned.
(60) Provisional application No. 60/089,536, filed on Jun. 17, 1998.

(51) Int. Cl.[7] .............................. G11B 5/48; G11B 21/16
(52) U.S. Cl. .................................................... 360/245.1
(58) Field of Search ....................................... 360/245.1

(56) References Cited

U.S. PATENT DOCUMENTS 5,019,931 A * 5/1991 Ohwe et al. ................. 360/104
5,661,619 A * 8/1997 Goss ............................ 360/104

FOREIGN PATENT DOCUMENTS

| JP | 62-28973 | * | 2/1987 |
| JP | 63-237273 | * | 10/1988 |

* cited by examiner

Primary Examiner—William Klimowicz
(74) Attorney, Agent, or Firm—Louis J. Bachand

(57) ABSTRACT

A recording head suspension is provided having a gimbaling dimple and a cooperating channel of greater longitudinal extension and substantially the same lateral extension as the dimple to permit rotation of the dimple and block substantial lateral movement and dislodgment of the dimple from the channel responsive to a lateral shock to the recording head suspension.

10 Claims, 1 Drawing Sheet

RECORDING HEAD SUSPENSION WITH COUPLED DIMPLE AND CHANNEL

RELATED APPLICATIONS

This application is a continuation-in-part of my copending application Ser. No. 09/215,405 filed Dec. 18, 1998, now abandoned, which application claims the benefit of U.S. Provisional Application Ser. No. 60/089,536 filed Jun. 17, 1998.

BACKGROUND OF THE INVENTION

1. Field of the Invention

This invention relates to recording head suspensions, and more particularly to improved structures in the load beam and flexure tongue portions of such suspensions, for increased resistance to loss of dimple contact upon lateral shock to the suspension.

2. Related Art

Recording head suspensions comprise a load beam carried by an actuator and a flexure fixed to or integral with the load beam and arranged to carry a slider that incorporates the recording head for travel over a disk having data in tracks. Freedom of movement of the slider in pitch and roll axes is maintained by having a dimple about which the flexure tongue carrying the slider can gimbal. Many factors influence the contact conditions at the dimple location, such as: the preload gram force imposed by the load beam, the flexure vertical and pitch stiffness, the degree of protrusion of the dimple, the forming height of flexure tongue, and friction conditions at the dimple location. For a double dimple contact configuration, see, for example, U.S. Pat. No. 5,666,241 to Summers and U.S. Pat. No. 5,652,684 to Harrison et al, maintaining the alignment of the opposed dimples is difficult given practical manufacturing tolerances, and changes in the Z offset of the suspension may result in non-uniform pitch and roll moments during flying of the assembly.

In the conventional one dimple on a flat surface arrangement, if the slider mass m is heavy and the impact acceleration a is high, a lateral impact force F (shock) tends to be greater than the friction force f at the dimple location. Thus, there is relative slippage between load beam and flexure in the dimple location as the suspension contact factors are overcome by the lateral shock force. This slippage further dampens the sway mode frequency and makes the sway mode response frequency lower.

An increase in the dimple height while presumably increasing the frictional forces f, also produces a high residual stress in the dimple from non-uniform deformation. The limit of dimple height increase is dictated by the metal forming limit; thus the final height of the dimple may be less than required.

SUMMARY OF THE INVENTION

It is an object of the invention therefore to provide an improved recording head suspension. It is a further object to provide a recording head suspension with increased resistance to lateral shock. A further object is to define a cooperating dimple and channel structure, one carried by the flexure tongue, the other by the load beam, such that the dimple is blocked on either side by channel walls but free to shift longitudinally, the channel being congruent and close-fitting laterally and larger in extension longitudinally. The dimple then can be in a normal range of radius and still the assembly will resist lateral shock forces dislodging the dimple from the channel.

These and other objects of the invention are realized in a recording head suspension comprising a base portion, a spring portion and a beam portion, a flexure carried by the beam portion, the flexure including a tongue for carrying a slider, the flexure tongue and the load beam portion defining in engaged relation a dimple having substantially the same lateral and longitudinal extension and a dimple retaining structure including a channel laterally congruent with said dimple and having a substantially larger longitudinal extension than the dimple and a lateral extension relative to the dimple lateral extension to closely receive and retain the dimple in laterally blocked but longitudinally free shifting relation, the dimple being blocked from substantial lateral movement and dislodgment from the channel by a lateral shock to the recording head suspension.

In this and like embodiments, typically, the dimple is defined by the flexure tongue and the channel by the beam portion, or vice versa, namely the dimple is defined by the beam portion and the channel by the flexure tongue; the channel has side walls and a bottom wall therebetween, the bottom wall being concave opposite the dimple, whereby the channel is generally cylindrical; the dimple has a given radius, the channel wall being of a larger radius than the dimple such that the dimple radius length is from about 85% to about 98% of a coincident channel radius length, whereby the dimple has rotational freedom within the channel; and the dimple is defined by the flexure tongue and the channel by the beam portion or the dimple is defined by the beam portion and the channel by the flexure tongue.

In a further embodiment, typically, the dimple has a diameter of from 0.01 to 0.025 inch, and is defined by the flexure tongue or the by the beam portion, the channel being defined in either the beam portion or the flexure tongue to be opposite the dimple.

BRIEF DESCRIPTION OF THE DRAWINGS

The invention will be further described as to an illustrative embodiment in conjunction with the attached drawings in which.

DETAILED DESCRIPTION

The present invention improves sway mode resonance frequency and overcomes high sideways shock through the use of an engaged or coupled dimple and channel, or cylindrical groove, that are formed separately in the load beam and flexure tongue area. When the dimple is formed in the load beam, the channel is formed in the flexure tongue.

The invention permits these advantageous results while using a channel having a lateral extension (radius of cylindrical groove) larger than the dimple radius to enable the dimple to rotate freely within the channel. Also, the protrusion of the dimple is similar or identical to conventional dimple design (0.002 inch to 0.010 inch for a dimple 0.010 to 0.025 inch in diameter) for high contact force at the dimple location.

The invention is further advantageous in readily achieving the required alignment between dimple and channel that is so difficult to obtain in a double dimple arrangement. The alignment of dimple and channel is ensured by tooling holes in the flexure and load beam, respectively, allowing the pivot point of the dimple to be exactly in the centerline of the channel. Changes in Z offset do not affect the alignment in the center of the channel.

The channel bottom wall, and the side wall as necessary, has a curvature congruent with the dimple curvature to provide a greater lateral or sideways constraint than the typical flat surface/dimple contact of the prior art. Thus there will be no, or minimum, slip in the lateral (transverse) direction despite an encountered lateral shock. The dimple has 2-degrees of constraint: y, z, or transverse and vertical. The dimple received in embracing channel constraint mechanism provides higher sway mode resonance frequency than the one-degree of freedom constraint (vertical) found in a dimple on flat surface structure as can be demonstrated with finite element analysis.

The invention suspension having an alignment couple dimple/channel overcomes lateral shock dislodgment force and, at the same time, increases the sway mode resonance frequency above that of a one dimple configuration; the alignment couple of a dimple/groove combination is thus better than a double dimple design.

Figure 1:
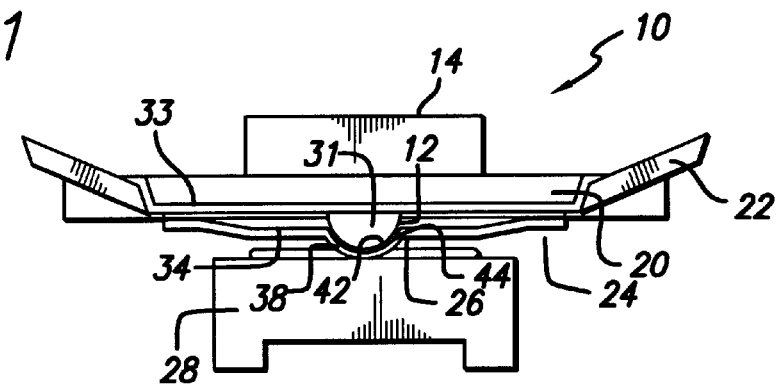
FIG. 1 is a front elevational view of the invention in a first embodiment, the dimple being formed in the load beam.
Figure 2:
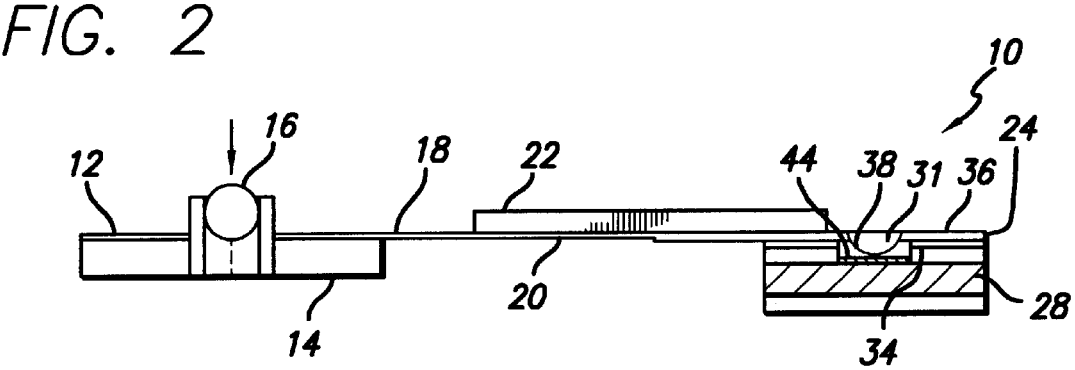
FIG. 2 is a side elevational view thereof.

With reference now to the drawings in detail, in FIGS. 1 and 2, the invention recording head suspension 10 is shown to comprise a base portion 12 shown staked to a mount plate 14 (and actuator not shown) by staking ball 16, a spring portion 18 and a beam portion 20 therebeyond, the beam portion having rails 22. Beam portion 20 carries a flexure 24 having a tongue 26 that carries a slider 28. Load beam portion 20 is formed with a dimple 31 by deflecting the beam portion wall 33 with a protuberant tool (not shown) having a fixed lateral and longitudinal extension to define the dimple dimensions. Opposite the dimple 31 the flexure tongue wall 34 defines a channel 38. Flexure tongue channel 38 has a lateral extent that is fixed at slightly greater than the transverse (or lateral) extent of dimple 31 so that the channel receives the dimple closely and not sideways slidable, thereby limiting lateral movement of the dimple within the channel to mechanical clearance for pivoting/rotating in place, and not allowing bodily shifting of the dimple from side-to-side in the channel.

The longitudinal extent of the channel 38 lies along the longitudinal axis of the load beam beam portion 20. This channel 38 longitudinal extent is greater than the corresponding extent in the dimple 31 and will allow the longitudinal shifting, and longitudinally varying placement of the dimple in the channel, even while being confined narrowly by the limited lateral extension of the channel.

Channel 38 is deep enough to closely receive a substantial portion, e.g. 15 to 30% of the height of dimple 31, or other amount sufficient to prevent dislodgment thereof upon a lateral shock imposed on the coupled parts. Thus the channel 38 depth is from 15 to 30% of the radius of the dimple 31 normal to the channel. Channel 38 further has a wall configuration such that the bottom wall 42 of the channel is concave and congruent with the dimple 31 and slightly larger in radius, and the channel side walls 44 are either straight or curved to be congruent with the dimple as well. With the curvilinear bottom wall 42 the channel 38 can be described as a cylindrical groove, as is further the case when the channel side walls 44 are also curvilinear. Specifically, to ensure proper fitment, any radius of the dimple 31 is just slightly shorter than the coincident radius of the channel 38 for the lower half of the dimple 31, e.g. the dimple 31 radius is from about 85% to about 98% of the channel 38 radius.

Figure 3:
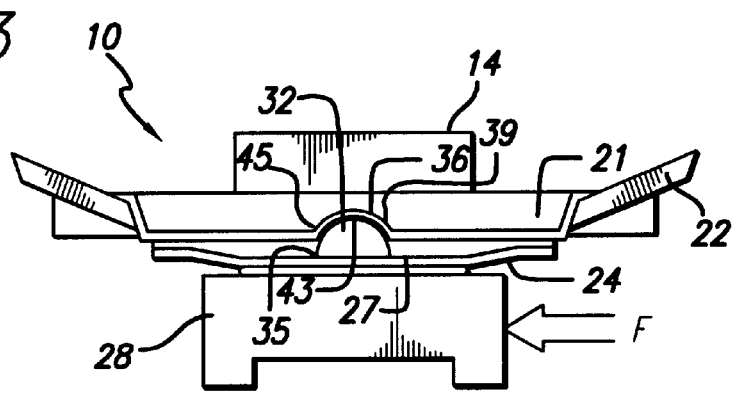
FIG. 3 is a view like FIG. 1 of the invention in a second embodiment, the dimple being formed I the flexure tongue.
Figure 4:
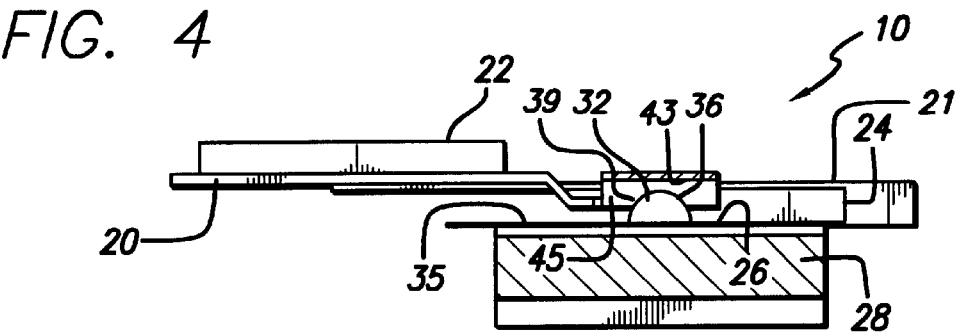
FIG. 4 is a side elevation view thereof.

In a second embodiment, shown in FIGS. 3 and 4, wherein like parts have like numbers to the previous Figures, the flexure tongue 27 defines a dimple 32 and the load beam beam portion 21 defines channel 39. The close fitting lateral and not longitudinal conformations of the dimple 32 and channel 39 are as described for the dimple 31 and channel 38 in the FIGS. 1 and 2 embodiment. Thus, flexure tongue 27 is formed with the dimple 32 by deflecting the flexure tongue wall 35 with a protuberant tool (not shown) having a fixed lateral and longitudinal extension to define the dimple. Channel 39 has a lateral extension that is fixed at slightly more than the dimple 32 lateral extension so that the channel receives the dimple closely and not laterally slidably, thereby limiting lateral movement of the dimple within the channel to only mechanical clearance for pivoting/rotating in place, while not allowing bodily shifting of the dimple from side-to-side in the channel.

The longitudinal extension of the channel 39 is along the longitudinal axis of the load beam beam portion 21, This channel 39 longitudinal extension is greater than the corresponding extension in the dimple 32 and will allow the longitudinal shifting, and longitudinally varying placement of the dimple in the channel, even while being confined narrowly by the lateral extension of the channel.

Channel 39 is deep enough to receive a substantial portion of the dimple 32, sufficient to prevent dislodgment thereof upon a lateral shock imposed on the coupled parts. See FIG. 3. The radius and other observations for dimple 31 and channel 38 above also apply here. Typically, the channel depth is from 15 to 30% of the radius of the dimple 32. Channel 39 has a wall configuration such that the bottom wall 43 of the channel is concave and congruent with the dimple 32 and slightly larger in radius, and the channel side walls 45 are either straight or curved to be congruent with the dimple as well. With the curvilinear bottom wall 43 the channel 39 can be described as a cylindrical groove, as is further the case when the channel side walls 45 are also curvilinear.

The invention thus provides an improved recording head suspension with increased resistance to lateral shock and increased sway mode resonance through the use of a cooperating dimple and channel structure, one carried by the flexure tongue, the other by the load beam, such that the dimple is blocked on either side by channel walls but free to shift longitudinally, the channel being congruent and close-fitting laterally and larger in extension longitudinally. The foregoing objects are thus met.

I claim:

1. A recording head suspension comprising a base portion, a spring portion and a beam portion, a flexure carried by said beam portion, said flexure including a tongue for carrying a slider, said flexure tongue and said beam portion defining in engaged relation a dimple having substantially the same lateral and longitudinal extension, said dimple having a given radius, and a dimple retaining structure including a channel laterally congruent with said dimple, said channel having a channel wall comprising side walls and a bottom wall therebetween that is concave opposite said dimple, said channel having a substantially larger longitudinal extension than said dimple and a lateral extension relative to said dimple lateral extension to closely receive and retain said dimple in laterally blocked but longitudinally free relation, said channel wall being of a larger radius than said dimple such that said dimple radius is from about 85% to about 98% of a coincident channel radius, said dimple being blocked from substantial lateral movement and dislodgment from said channel by a lateral shock to said recording head suspension, whereby said dimple has rotational freedom within said channel.

2. The recording head suspension according to claim 1, in which said dimple is defined by said flexure tongue and said channel by said beam portion.

3. The recording head suspension according to claim 1, in which said dimple is defined by said beam portion and said channel by said flexure tongue.

4. A recording head suspension comprising a base portion, a spring portion and a beam portion, a flexure carried by said beam portion, said flexure including a tongue for carrying a slider, said flexure tongue and said beam portion defining in engaged relation a dimple having substantially the same lateral and longitudinal extension and a dimple retaining structure including a channel laterally congruent with said dimple and having a substantially larger longitudinal extension than said dimple and a lateral extension relative to said dimple lateral extension to closely receive and retain said dimple in laterally blocked but longitudinally free relation, said dimple being blocked from substantial lateral movement and dislodgment from said channel by a lateral shock to said recording head suspension, said dimple having a diameter of from 0.010 to 0.025 inch.

5. The recording head suspension according to claim 4, in which said dimple is defined by said flexure tongue or said by said beam portion, said channel being defined in either said beam portion or said flexure tongue to be opposite said dimple.

6. The recording head suspension according to claim 5, in which said channel has side walls and a bottom wall therebetween, said bottom wall being concave opposite said dimple.

7. The recording head suspension according to claim 6, in which said channel wall is congruent with said dimple and of a larger radius than said dimple radius, whereby said dimple has rotational freedom within said channel.

8. The recording head suspension according to claim 7, in which said dimple is defined by said flexure tongue and said channel by said beam portion.

9. A recording head suspension comprising a base portion, a spring portion and a beam portion, a flexure carried by said beam portion, said flexure including a tongue for carrying a slider, said flexure tongue and said beam portion defining in engaged relation a dimple having substantially the same lateral and longitudinal extension and a lower half having a radius, and a dimple retaining structure including a channel having a radius and laterally congruent with said dimple lower half and having a substantially larger longitudinal extension than said dimple and a lateral extension relative to said dimple lower half lateral extension to closely receive and retain said dimple in laterally blocked but longitudinally free relation, said dimple radius being from about 85% to about 98% of said channel radius, said dimple being blocked from substantial lateral movement and dislodgement from said channel by a lateral shock to said recording head suspension.

10. The recording head suspension according to claim 9, in which said channel depth is 15 to 30% of the radius of said dimple.

* * * * *